US008868666B1

(12) United States Patent
Hellwege et al.

(10) Patent No.: US 8,868,666 B1
(45) Date of Patent: Oct. 21, 2014

(54) METHODS, DEVICES AND SYSTEMS FOR CONTENT DISCOVERY, AGGREGATION AND PRESENTMENT OVER A NETWORK

(75) Inventors: Stephen A. Hellwege, Ladera Ranch, CA (US); Derek Hee Jun Cha, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 191 days.

(21) Appl. No.: 13/359,371

(22) Filed: Jan. 26, 2012

(51) Int. Cl.
*G06F 15/16* (2006.01)

(52) U.S. Cl.
USPC .......................................... 709/206; 709/203

(58) Field of Classification Search
None
See application file for complete search history.

(56) References Cited

U.S. PATENT DOCUMENTS

| 7,296,284 | B1 * | 11/2007 | Price et al. ....................... 725/39 |
| 7,793,326 | B2 | 9/2010 | McCoskey et al. |
| 7,813,965 | B1 * | 10/2010 | Robinson et al. ............. 705/26.1 |
| 7,962,937 | B2 * | 6/2011 | Cho et al. ......................... 725/44 |
| 8,019,777 | B2 * | 9/2011 | Hauser .......................... 707/769 |
| 2003/0028889 | A1 | 2/2003 | McCoskey et al. |
| 2003/0028896 | A1 | 2/2003 | Swart et al. |
| 2003/0200314 | A1 | 10/2003 | Giffin |
| 2004/0002993 | A1 * | 1/2004 | Toussaint et al. .......... 707/104.1 |
| 2006/0029005 | A1 * | 2/2006 | Slemmer et al. ............. 370/270 |
| 2007/0266141 | A1 * | 11/2007 | Norton .......................... 709/224 |
| 2008/0040354 | A1 | 2/2008 | Ray et al. |
| 2008/0046929 | A1 * | 2/2008 | Cho et al. ......................... 725/46 |
| 2010/0313215 | A1 | 12/2010 | McCoskey et al. |
| 2011/0015968 | A1 | 1/2011 | Carlson |
| 2011/0088100 | A1 * | 4/2011 | Rutman .......................... 726/28 |
| 2011/0204142 | A1 * | 8/2011 | Rao ............................... 235/380 |
| 2011/0209185 | A1 * | 8/2011 | Cho et al. ......................... 725/93 |
| 2012/0117146 | A1 * | 5/2012 | Amidon et al. ............... 709/203 |
| 2013/0151615 | A1 * | 6/2013 | Ho ................................. 709/204 |
| 2013/0166649 | A1 * | 6/2013 | Atzmon et al. ............... 709/204 |

* cited by examiner

*Primary Examiner* — Ninos Donabed

(57) ABSTRACT

A media aggregator device includes a plurality of interfaces, at least one of which may be configured to couple to a local network and at least one processor coupled to the plurality of interfaces. The processor may be operable to access a first device coupled to the local network and catalog media content stored on the first device; access a second device and catalog media content stored on the second device; populate a media aggregator database with references to the media content cataloged in the first and second devices, and present contents of the populated media aggregator database to a client device to enable the client device to access any of the media content referred to in the media aggregator database, subject to appropriate access rights.

26 Claims, 5 Drawing Sheets

US 8,868,666 B1

METHODS, DEVICES AND SYSTEMS FOR CONTENT DISCOVERY, AGGREGATION AND PRESENTMENT OVER A NETWORK

BACKGROUND

Today, many users have their media content spread across multiple devices and storage drives. Such devices may include computer hard disk drives, Network-Attached Storage (NAS) devices, smartphones, tablets, and all manner of other network-enabled devices. Unfortunately, it has proven to be difficult for the user to readily access and enjoy such widely-disseminated media content. Conventional solutions require complicated software that is both difficult to use and to configure, and that requires the user to copy the selected media content from each of the devices to a single central location from where it may be accessed. Moreover, when new media content is added to any of these devices, the user must then manually copy the newly-acquired media content to the central location, where it may be accessed. In addition, users with a large media library may wish to execute searches on their media library to find specific media content or media content matching one or more search parameters, and to do so across all of their media content-containing devices. However, existing desktop search tools, such as Mac Spotlight and Google Desktop search are only configured to search through a host device and its local storage. What are needed, therefore, are devices and methods that do not suffer from the above-identified disadvantages and that enable users to more effectively and conveniently access their accumulated media content, whether such media content is stored locally on the user's currently used device or external thereto.

DETAILED DESCRIPTION

Some embodiments include devices and methods for dynamically aggregating media content across some or all storage accessible on a given local network or directly connected to the media aggregator device, storing references to the aggregated media content in a media aggregator database stored within, coupled or otherwise accessible to the present media aggregator device and enabling selection and serving or streaming of any of the media content referred to in the media aggregator database to a display. In one embodiment, the display is part of a client device and the content is selected and provided to the display of the client device based on access rights of the client device.

Figure 1:
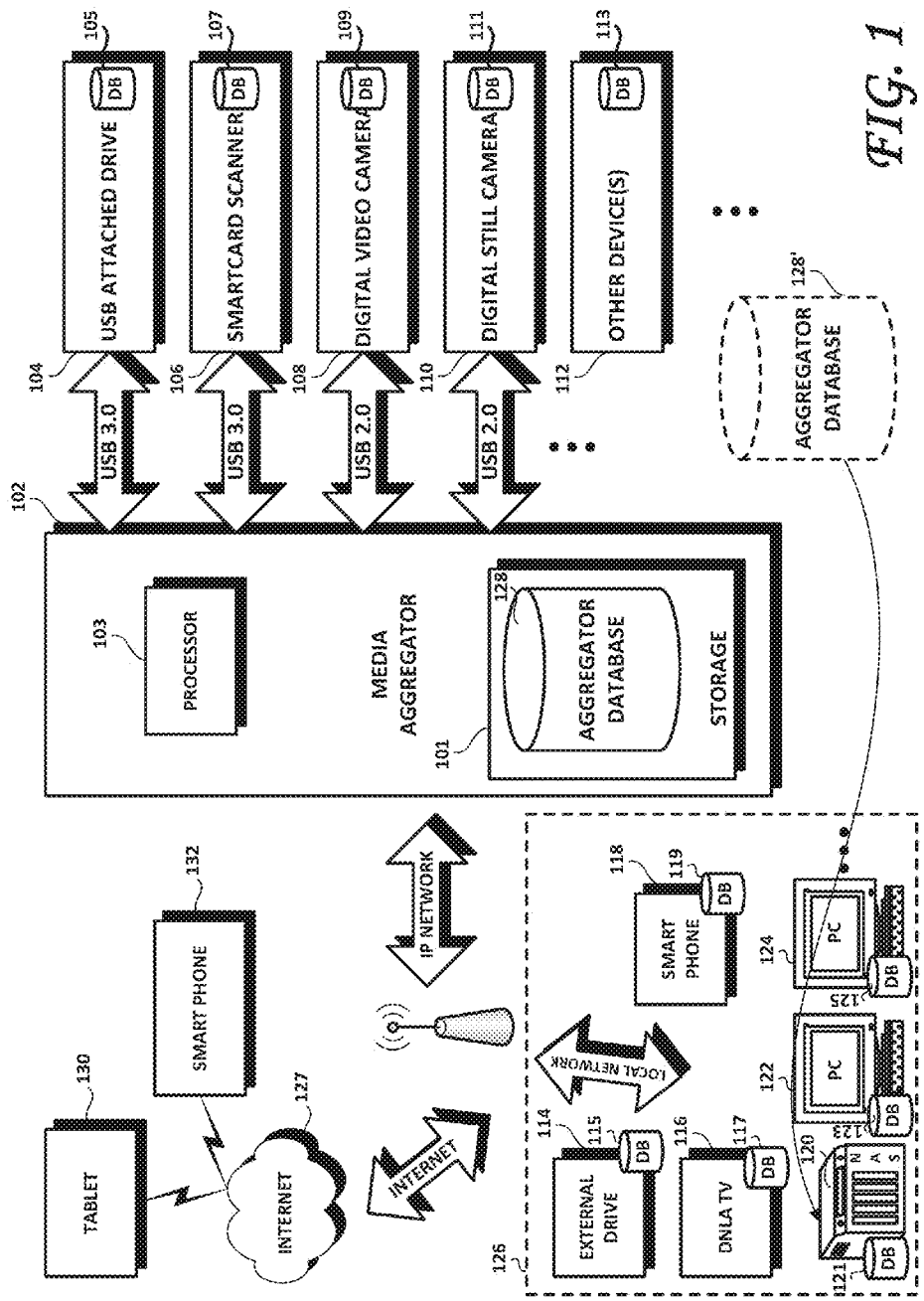
FIG. 1 is a diagram illustrating an example network according to one embodiment.

FIG. 1 shows aspects of a media aggregator device according to one embodiment. As shown therein, numeral 102 references a media aggregator device. The media aggregator device may be a standalone, self-powered device that does not require a host such as a personal computer or a laptop to operate. According to another embodiment, however, the functionality of the media aggregator 102 and the methods detailed herein may be incorporated in a computer or other network-enabled device. As shown in FIG. 1, the media aggregator 102 may include a processor 103 and storage 101 (e.g., a hard disk drive, RAM, ROM and/or non-volatile memory). The processor 103 may include any combination of hardware, software, and/or firmware that executes instructions or operations for the media aggregator 102. The media aggregator may include any combination of hardware, software and/or firmware that implements the functionality described and shown herein. For example, in one embodiment, the media aggregator comprises a display.

The media aggregator 102 may be coupled to a variety of storage devices and/or content delivery devices such as, for example, a USB drive 104, a smartcard scanner 106, a digital video camera 108, a digital still camera 110 and/or other device, collectively referenced at 112. These devices 104-112 may be directly connected to the media aggregator 102, through a corresponding number of, e.g., serial interfaces. For example, the media aggregator 102 may include a plurality of Universal Serial Bus (USB) 2.0 or 3.0 (or higher) and/or may include one or more Ethernet and/or FireWire interfaces, for example. Other interfaces may be provided in addition to or in place of the above-listed serial interfaces, as those of skill in this art will appreciate. The media aggregator 102 may then, according to embodiments of the present inventions, present any of these connected devices 104-112 as shared devices to any eligible client device (i.e., any properly authenticated and/or otherwise authorized client connected to the media aggregator 102, on the local network 126 or coupled to the Internet 127). The media aggregator 102 may be, or form part of, the client device or may be separate therefrom.

According to one embodiment, the media aggregator 102 may be configured to automatically recognize new devices that are connected thereto (e.g., devices 104-112) or accessible to the media aggregator 102 over a local network (e.g., devices 114-124 in FIG. 1) and catalog the media content stored on each. According to one embodiment, a Notifier process (e.g., reference 502 in FIG. 5) may be included that allows the media aggregator 102 to recognize when a device, such as a USB drive, is newly connected thereto or otherwise accessible via a network and efficiently catalog the media content stored on the recognized device. Unlike conventional desktop search tools, the media aggregator 102 may be configured to identify storage devices as they are connected/disconnected from the network and dynamically update the status of these devices and catalog the media content stored therein.

Figure 2A:
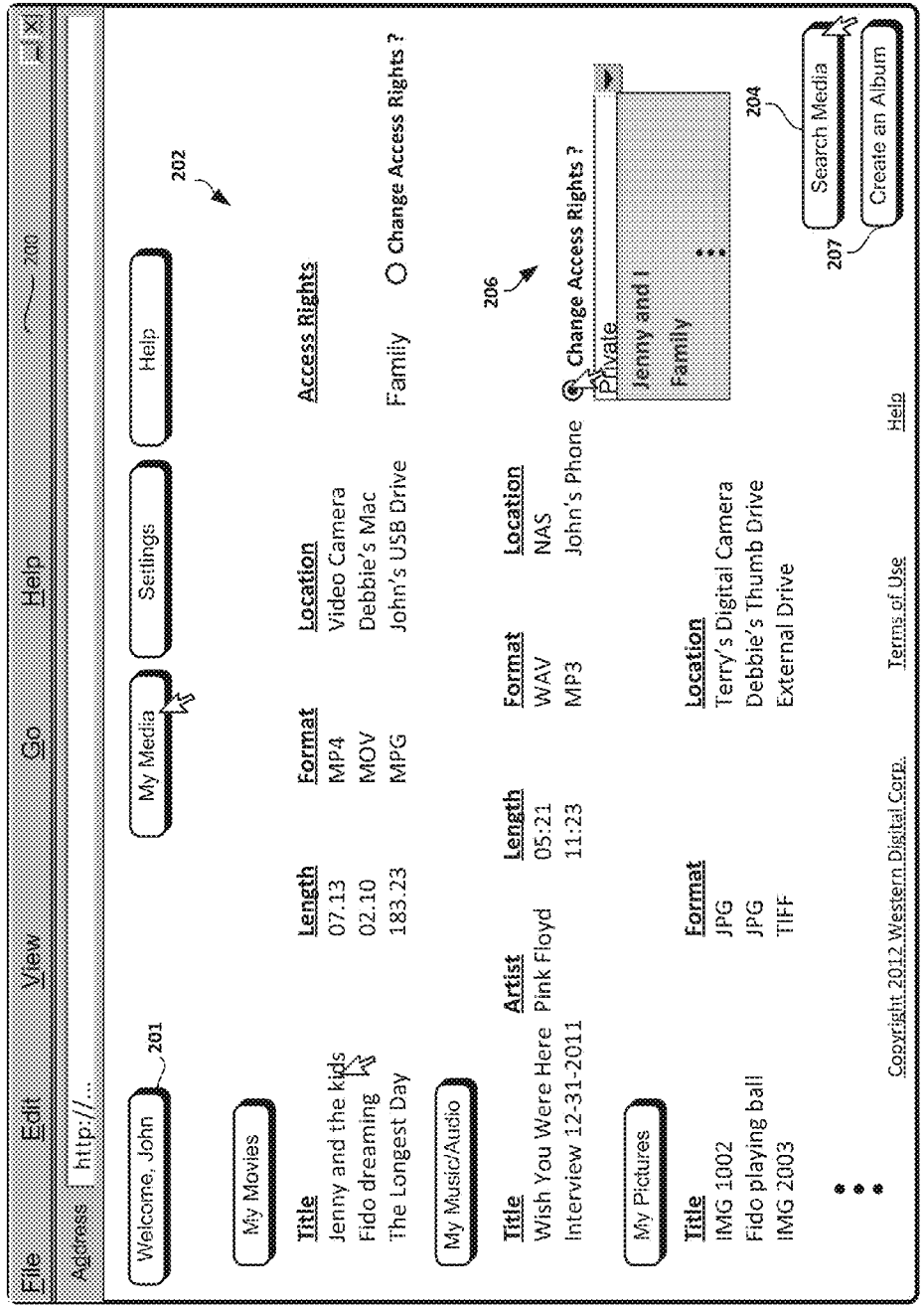
FIG. 2A is a representation of an exemplary user interface according to one embodiment.
Figure 2B:
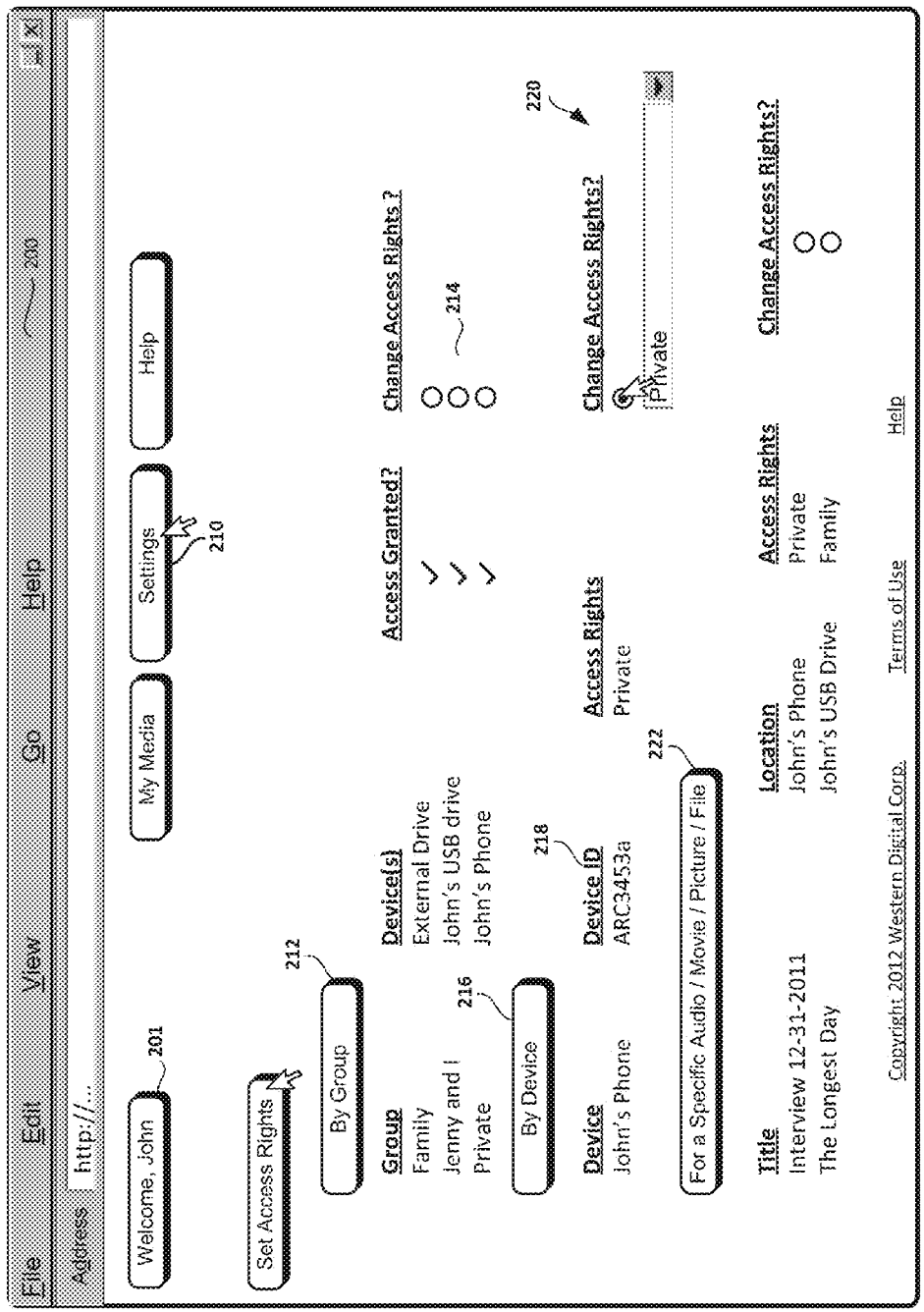
FIG. 2B is another representation of an exemplary user interface according to one embodiment.

According to one embodiment, the media aggregator 102 may create and populate a media aggregator database 128 with references (e.g., pointers or links) at least to the media content stored in one or more of the connected devices 104-112. This populated media aggregator database 128 may then be presented to an eligible client device (e.g., previously authorized device or previously unknown device operated by a properly authenticated user) through a suitable user interface (such as for example, the user interface shown at 400 in FIG. 4A) to enable the eligible client device to selectively access any of the media content referenced in the media aggregator database 128, subject to appropriate access rights. This access may take the form of, for example, streaming the selected media content to the eligible client device. According to one embodiment and as shown in FIGS. 2A and 2B, the suitable user interface may be a web interface such as a browser. The user interface, preferably, may be configured to enable the eligible client device, upon receipt of user interactions therewith, to perform searches for media content that matches one or more search criteria. This may be accomplished by running queries against the records stored in the media aggregator database 128. Indeed, according to one embodiment, the media aggregator 102 may be configured to enable a user, through interaction with a user interface on a client device, to access a selected subset or all of the media content stored on the devices 104-112 directly connected to the media aggregator 102 and, if the media aggregator 102 is coupled to the local network 126 shown in FIG. 1, to access of the media content stored on the devices 114-124 coupled to the local network 126. In one embodiment, the content is selected and provided to a display of the client device based on access rights of the client device.

FIG. 2A shows an example browser 200 according to one embodiment configured to present the aggregated content of the media aggregator database 128. As shown therein, the browser 200 is configured to show the different types of media content available in the media aggregator database 128; namely, movies, music or other audio content and pictures to which the logged-in user (John, in this example, see reference 201) has access rights. According to other embodiments, other content types such as, for example, different types of documents, scripts, source code and/or executables may be displayed. The browser 200 may be displayed on most any suitable device having a display that is directly connected to the media aggregator 102 or that is configured to access the media aggregator device from the local network 126 or from the Internet 127. Examples of such suitable devices include a tablet 130, a smartphone 132 or any other Internet-connected device such as a personal computer. As shown, the browser 200 may be configured to display a clickable active link to each media content file, whether movie, music or other audio or picture cataloged in the media aggregator database 128 to which the client device (or user) has access rights. According to one embodiment, media content to which the logged in user has not secured access rights may not be presented to the user in the user's media library 202.

According to one embodiment, the browser 200 may be configured to list all or selected portions of the media content's identifying details, metadata or file characteristics such as, for example, the title of the movie, song/audio, document, or picture, the length (for movies and music/audio), the format thereof, as well as the device where such media content is stored. A greater or lesser number of identifying details may be shown in the browser 200, as those of skill in this art will recognize. When the user clicks or otherwise selects one of the media content files listed, the thus-requested media content may be displayed or otherwise rendered on the client device that requested the file. A sample of the media content may also be rendered, such as an audio clip or video excerpt. The media library 202 displayed on the browser 200 may also be configured to display thumbnail versions of pictures or video media content. According to one embodiment, the requested media content may be accessed by and, for example, streamed to a display. Prior to streaming the requested media content, the media content file containing the requested content may be transcoded to another format, resolution, bitrate, frame rate and/or otherwise modified according to the bandwidth of the transmission channel and/or the audio/visual capabilities of the device having requested the media content. Such transcoding may be carried out preemptively; that is, before the media content is requested, and stored locally on the device in which the media content is stored. Alternatively, such transcoding may be carried out on the fly, substantially contemporaneously with the streaming thereof to the device having requested the media content. Alternatively still, the requested media content (or a transcoded version thereof) may be downloaded to the requesting device.

As also shown in FIG. 2A, the user may be enabled to search his or her aggregated media library 202, as shown at 204. The search may be carried out according to one or more search parameters and will return all relevant media content whose references are stored on the media aggregator database 128, irrespective of where the corresponding media content files are physically stored.

Catalogued and aggregated media content may also be shared. Indeed, embodiments of the present inventions enable the creation, as indicated at 207, of an album that includes media content selected from the media aggregator database 128. The album may include a number of media content files such as, for example, a number of video and/or audio files. A link may then be generated to the created album. The user may then send an electronic message (such as, for example, an email) containing the link to the created album to a selected recipient. The recipient may then click on the link embedded in the electronic message and stream (or otherwise access) the contents of the album pointed to by the link to his or her network-connected device.

In one embodiment, the media library 202 may be configured to present to the user only those media content files to which the user has appropriate access rights. The user may also be given the opportunity, according to embodiments of the present inventions, to change the access rights to one or more of the media content files presented to him or her in the media library 202. As shown at 206, a radio button (or some other functionally equivalent user interface device) may be provided, enabling the user to change the access rights associated with one or more of the media content files presented in the media library 202 (provided the user has the right to do so). For example, there may be media content files presented in the media library 202 that a particular user has the right to access and view, but to which the user may not have the rights to modify, delete or change the access rights thereto. Assuming that the user has appropriate access rights, the user may be provided with the opportunity to change the access rights of a particular media content file. In the example of FIG. 2A, the user has chosen to change the access rights to the media content file "Interview Dec. 31, 2011". The user may change the access rights to this media content file to enable only him or herself to have access thereto, or may limit access to the selected media content file to predefined groups of users, such as "Family" or "Jenny and I" as shown in FIG. 2A. Access, as is described in greater detail relative to FIG. 2B, may also be based upon password authentication or by accessing device through a DeviceID identifier that is unique to the accessing device, to identify but a few possibilities. Various user interface devices, such as the exemplary drop down menu structure shown at 206, may be used to enable the user to change the access rights to the media content files presented in the media library 202.

FIG. 2B is another representation of an exemplary user interface according to one embodiment. By clicking a "Settings" tab 210, the user may be provided with a user interface configured to enable the user to view and/or change the access rights of the media content to which that user has access and to which the user has the authority to make such access rights changes. As shown, access rights may be granted or otherwise set by, for example, groups 212, by accessing device 216 or for a specific media content file 222. Other logical groupings of users, devices and accessing devices may be devised for the purpose of flexibly restricting access rights, as those of skill in this art may recognize. As shown in the example shown in FIG. 2B, the group "Family" has been granted (by the logged in user "John") full access to the media content files stored on the device "External Drive". The group "Jenny and I" has been granted access to the media content files stored on the device "John's USB drive" (that is, on the volume within the device called "John's USB drive") and the group "Private" is granted the right to access the media content files stored on the device "John's Phone". The access rights to any one of these groups, devices or combinations thereof may be changed by, for example, clicking the adjoining radio buttons 214. Access rights may also be defined by device, as shown at 216. According to one embodiment, all of the devices that are configured to access the media aggregator database 128 and/or the devices whose stored media content have been crawled, cataloged and aggregated by the media aggregator 102 may be assigned a unique device identifier, such as the DeviceID shown at 218 in FIG. 2B. As suggested at 220, the access rights to a particular device may be chosen and set by the user. In the example of FIG. 2B, the user has chosen to restrict access to the media content files on the device identified by DeviceID ARC3453a to the group "Private". Alternatively still, access rights to individual media content files may be set by the user, as shown at 222.

Figure 3:
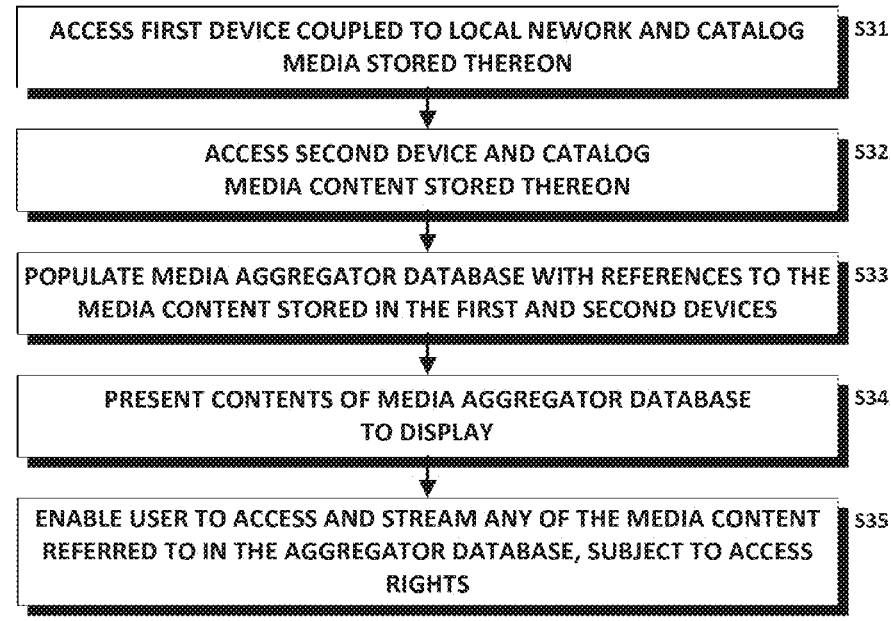
FIG. 3 is a flowchart for aggregating data from two devices according to one embodiment.

Turning now to FIG. 3, the media aggregator 102, according to one embodiment, is configured to access a device (such as shown at 114-124 in FIG. 1) that is coupled to a local network 126 (block S31). Once the media aggregator 102 accesses the device, the media aggregator 102 catalogs the media content stored on the accessed device. References (e.g., pointers and/or other identifying information) to the cataloged media content found in the accessed device, according to one embodiment, may then be stored within the accessed device and/or in storage that is otherwise local to the accessed device and/or remotely therefrom (such as in the cloud, for example). For example, the references to the media content stored on an accessed device may be stored in a local database (shown at 115-125 in FIG. 1) within the accessed device's own storage, in storage that is local to the accessed device or in storage that is otherwise accessible thereto. In like manner, the media aggregator 102 may also access the devices 104-112 directly connected thereto and reference to the media content found and cataloged therein may be stored within a database 105, 107, 109, 111, 113 that is local to the devices 104, 112, as suggested at block S32 in FIG. 3. The local databases 105, 107, 109, 111, 113 (FIG. 1) may be stored within the connected device's own storage, in storage that is local to the connected device or in storage that is remote therefrom, such as in the cloud, for example.

According to one embodiment, the media aggregator 102 may be configured to populate the media aggregator database 128 with the references to the media content stored in local databases 115-125 and 105-113—in effect, creating a database of the local databases 115-125 and 105-113 (block S33). For example, the media aggregator 102 may execute an (e.g., SQL or functionally equivalent) "Join" command, causing the records from the local databases 115-125 and 105-113 to be effectively joined into a single database (media aggregator database 128, in this case).

The contents of the media aggregator database 128 may then be presented to a display to enable access to a selected subset or all of the media content cataloged in any of the accessed devices 114-124 and to access and, e.g., stream any of the media content cataloged in any of the connected devices 104-112 (block S34). In one embodiment, the access is provided subject to access rights associated with a client device (block S35). This access and streaming may be carried out, for example, through a dedicated application on a computer or mobile device or via a web browser.

According to an embodiment, the media aggregator 102 may be configured to be a DLNA (www.dlna.org) compliant device and configured as a Digital Media Server (DMS). The media aggregator 102 may include a processor 103 (e.g., an ARM processor) that is capable of running various applications (including the managing software for the media aggregator 102), of carrying out media content file processing and of carrying out streaming operations to stream selected media content to one or more displays. The media aggregator 102 may, as noted above, include a plurality of interfaces including, for example, USB, USB 3.0, Ethernet, WiFi, Firewire and the like.

Figure 4:
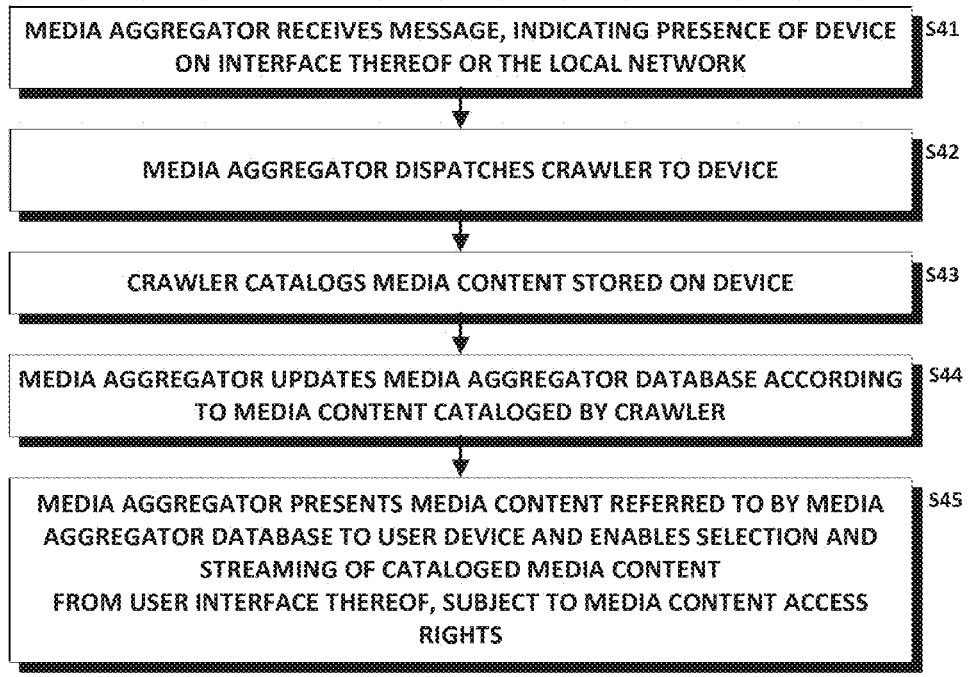
FIG. 4 is a flowchart for detecting the presence of a device and aggregating data from that device according to one embodiment.

FIG. 4 is a flowchart for detecting the presence of a device and aggregating data from that device according to one embodiment. According to one embodiment, the media aggregator 102 receives a message that is indicative of the presence of a device coupled to an interface thereof or present on the local network (e.g., local network 126 in FIG. 1), as shown at block S41. At block S42, the media aggregator dispatches a crawler to the device whose presence was indicated by the received message. A crawler is a software program that scans file systems and provides data about the media content file population. A crawler may be a standalone software module or may form a part (such as a thread) of an application. The dispatched crawler may then catalog the media content of the device which the crawler was dispatched, as shown at block S43. According to one embodiment, the crawler may store the cataloged media content in a database (such as databases 115, 117, 119, 121, 123 and 125 in FIG. 1) that are local to the crawled device. The crawler then reports back to the media aggregator 102, which then updates the media aggregator database 128 with the media content stored on the cataloged device, as shown at block S44. An eligible client device may then access the media aggregator database 128 and request access to the media content cataloged therein. Access rights associated with the eligible client device may then be determined and a subset of the media content in media aggregator database 128 may be selected based on the access rights of the eligible client device. The selected subset of the media content referred to in the media aggregator database 128 may then be presented to a display of the eligible client device, via a suitable user interface. The user of the eligible client device may then select from the presented media content and access (e.g., stream) the selected media content, as shown at block S45 in FIG. 4.

Figure 5:
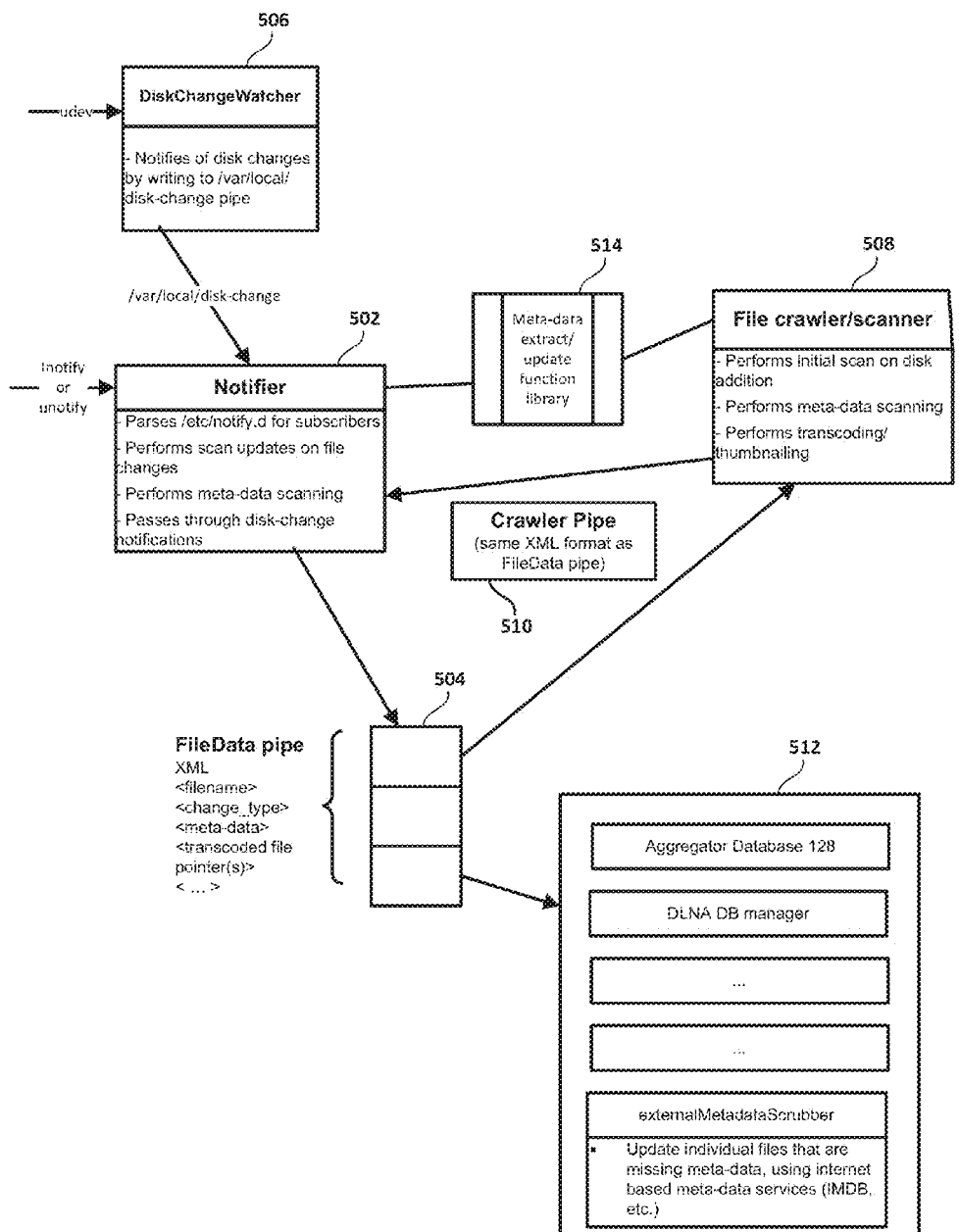
FIG. 5 shows aspects of the messaging architecture according to one embodiment.

According to one embodiment shown in FIG. 5, the media aggregator 102 may be configured to recognize when a new device or volume is connected thereto or coupled to the local network and to generate and dispatch a crawler (block 508) to access the newly recognized device and identify and catalog its media content. A process running on the media aggregator 102 may be configured to create and to maintain the media aggregator database 128, which may be made accessible to a host, clients, whether local or remote. The media aggregator 102 may be configured to dynamically recognize connected or otherwise accessible devices so that storage devices can be intermittently connected and reconnected, for example, as dynamic drives. Information can be retrieved based on known tools such as SAMBA share, PC file sharing, Apple file sharing, and the like.

According to one embodiment, the media aggregator 102 may be self-powered and/or may be configured for disk-less boot, e.g., from Read Only Memory (ROM) in the form of, for example, a Solid State Drive (SSD). In one embodiment, the media aggregator 102 may be configured with a storage device designated as its primary storage location for the media aggregator database 128. Alternatively, the media aggregator 102 may be configured to dynamically search for a primary storage; that is, storage in which to store, among others, the media aggregator database 128. The media aggregator database 128, therefore, may be stored within the media aggregator 102 or remotely therefrom, such as within one of the devices 114-124. In the exemplary embodiment of FIG. 1, the media aggregator database alternatively may be stored, for example, within the NAS 120, as suggested at 128'. The media aggregator 102 may provide a management interface such as, for example, a web service to allow for configuration and management of the device.

In one embodiment, a messaging infrastructure may be relied on to notify the media aggregator 102 and its implementing software and/or other applications) of changes to the media content file population of the disks and devices connected to or accessible to the media aggregator 102. Advantageously, one embodiment may utilize the Linux operating system, and the media aggregator 102 and/or other applications may use the "inotify" mechanism to register for notifications of changes to the file system. "inotify" is a Linux kernel subsystem that acts to extend filesystems to notice changes to the filesystem, and report those changes to applications.

In one embodiment, a notifier mechanism may be included in the media aggregator 102 such as a notification daemon, together with one or more crawlers. FIG. 5 shows aspect of a suitable crawler/notifier architecture employing such notifier daemon, according to one embodiment.

As shown therein, the Notifier 502 may be configured as a single program that handles notifications for all media content. The Notifier 502 takes an "inotify" or a variant thereof (according to one embodiment) called "unotify" (which is similar to Linux' "inotify") and generates a standard-format message that is sent to the media aggregator database 128 and/or other processes or applications on the system, to notify them of changed media content files. The Notifier 502 may include a collection of configuration files in (e.g., in "/etc/notify.d") for subscribers (e.g., the media aggregator database 128 and/or applications) that wish to receive notification of changed media content files in devices directly connected to or coupled to the media aggregator 102 over a local network. The Notifier 502 may support dynamic update of the configuration by re-parsing the configuration files upon a predetermined event. Interested subscribers may then specify to the Notifier 502, through their respective configuration files, the path to a named pipe (such as FileData pipe 504 in FIG. 5) at which the subscriber will receive messages relating to changed media content files across devices. As shown, the Notifier 502 may carry out or cause to be carried out, a meta-data scan of the media content file including, for example, album-art extraction and the like. The messages created by Notifier 502 may be, for example, formatted as XML text, specifying the affected file path, the type of change (add, delete, modify), and any metadata available within the file, such as ID3 tags, for example.

The DiskChangeWatcher 506 is coupled to the Notifier 502 and is a process (e.g., a script) that takes "udev" as input (a Linux device manager), manages device nodes and enables a notification to be generated and sent to the media aggregator 102 and other registered applications when devices (such as devices 104-112 and 114-124) are added to or removed. Applications (the implementing software of the media aggregator 102 included) that need to know of disk changes (devices, volumes being added or removed) create a uniquely-named pipe in "/var/local/disk-change" where such notifications are written. When udev is notified that a disk/device with storage has been added or removed, the DiskChangeWatcher 506 sends (for example) an XML-formatted message through the aforementioned uniquely-named pipe specifying the change. The media aggregator 102 (and any other applications that have subscribed to receive such notifications) may then take appropriate action to account for the change such as, for example, invalidating database records when a disk is removed or adding database records when a disk is added. Preferably, the Notifier 502 should subscribe to the messages from the DiskChangeWatcher 506, and copy the received message to the FileData pipe 504. This will help ensure serialization of the FileData pipe 504.

In one embodiment, one of the primary responses to the addition of a disk or device (such as devices 104-112 and 114-124 in FIG. 1) is to activate a crawler program or program thread, shown at reference numeral 508 in FIG. 5 and dispatch same to the newly added or modified device for the purpose of cataloging changes therein. According to an embodiment, there may be a single crawler 508 for the entire system which, for example, may run per-disk threads or instances. The crawler 508 may perform extractions of new device/file changes for the purpose of updating the media aggregator database 128. The crawler 508 may not register for file system notifications with the operating system, but may register with the Notifier 502. According to one embodiment, the crawler 508 may carry out or cause to be carried out transcoding for pictures and/or audio or video content, as detailed above. Also, the crawler may also carry out, or cause to be carried out thumbnailing for picture files, as well as any additional meta-data scanning required, as shown at 514 beyond that which the Notifier 502 provides. According to an embodiment, the crawler 508 does not update the media aggregator database 128 directly. Instead, the crawler 508 may generate and send standard format (XML, for example) messages to the FileDataPipe 504. It is to be noted that there may be more than one FileDataPipe 504, each updated in parallel and each accessed by a separate subscriber (such as the media aggregator database 128, for example).

The crawler 508 may also send messages to a separate named pipe ("CrawlerPipe" 510 in FIG. 5) that may be read by the Notifier 502 for every media content file encountered during the crawl, but not for those identified by the Notifier 502. The path to the CrawlerPipe 510 may be a command line option, in a configuration file read by both the control script of both the crawler 508 and the Notifier 502 and may default to "/var/local/notifyd". The messages of the CrawlerPipe 510 are preferably in the same format as those produced the Notifier 502, which will then re-distribute those messages according to the rules provided by registered applications. The crawler 508, according to one embodiment, may then scan the media content of newly-attached devices once while the Notifier 502 watches for changes to mounted file systems (through receiving a message from the DiskChangeWatcher 506, it being understood that there may be redundant messages if a file is added to some path ahead of a scan by the crawler 508.

Applications 512 (including the manager of the media aggregator database 128) may be configured to read from the FileData pipe(s) 504, and parse the XML message contained therein format to update their own databases. According to one embodiment, other applications may be configured to subscribe to and gain access to the XML messages in the FileData Pipe(s) 504 to enable them to update their own databases, as each accessing application may retain the flexibility of keeping its own database and schema. Applications that modify meta-data may do so at the file level. This will enable the Notifier 502 to automatically pick up the changes and write the changes to the FileData pipe 504. All applications may then read the change, and update their respective databases, such as the media aggregator database 128.

The use of named pipes allows for some debug capability, in that the output of the crawler 508 can be fed directly to an application by having the application read from the pipe that would have been used by the Notifier 502. Indeed, Linux allows hard links to named pipes (on the same file system), so the crawler 508 may be writing to "/var/local/notifyd" while the application is reading from "/usr/local/lib/application-pipe".

Some embodiments provide an easy to use aggregation platform, especially in a home/small office environment. Some embodiments also provide a transparent platform for enabling access and, for example, streaming from a large storage device (or a virtual aggregation of a plurality of smaller-capacity storage device) to mobile devices, such as a tablet computer, without the need for a host, from any of the client devices connected/coupled to and cataloged by the media aggregator 102 via a suitable interface, such as shown at 500 in FIG. 5, for example. The access and streaming of the media content may be configured so as to be subject to appropriate access rights for the user, group, device and/or specific media content file being accessed. Furthermore, some embodiments enable users to take full advantage of their many storage devices and make best use of their expanding media content libraries. Moreover, some embodiments enable users to easily incorporate new storage devices into their network and the media content thereof into their consolidated media content library or libraries.

While certain embodiments of the inventions have been described, these embodiments have been presented by way of example only, and are not intended to limit the scope of the inventions. Indeed, the novel methods, devices and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions. For example, those skilled in the art will appreciate that in various embodiments, the actual structures and functionalities described herein may differ from those shown in the figures. Depending on the embodiment, certain of the steps described in the example above may be removed, others may be added. For example, the media aggregator 102 may include functionality and comprise software to identify multiple copies or different versions of the same content across different storage devices on a network. When such duplicates or different versions are encountered, the media aggregator 102 may offer the user various cleanup or migration options and tools to make more efficient use of available storage resources. Also, the present media aggregator 102 may also include software to assist in data archiving, backup, and performance management. For example, older content or less-accessed content may be moved to slower or older storage devices while more recent or frequently-accessed content may be moved to comparatively faster storage. Furthermore, the present media aggregator 102 may be configured to be compliant with various Digital Rights Management (DRM) systems to protect against unauthorized copying and unauthorized dissemination of copyrighted media content. Those of skill in this art may recognize that other structures and functionalities may be added or substituted for those described and shown herein without, however, departing from the scope of the present embodiments. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A media aggregator, comprising:
a plurality of interfaces, at least one of the plurality of interfaces being configured to couple to a local network;
at least one processor coupled to the plurality of interfaces, the processor operable to:
identify a presence of a first device on the local network and cause, over the local network, a crawler process to operate on the first device;
access the first device coupled to the local network and catalog media content files stored on the first device, each of the cataloged media content files stored on the accessed first device being associated with previously-granted access rights;
access a second device and catalog media content files stored on the second device, each of the cataloged media content files stored on the accessed second device being associated with previously-granted access rights;
populate a media aggregator database with references to and with the previously-granted access rights associated with the media content files cataloged in the first and second devices;
receive a request to access the media aggregator by an accessing device, the request comprising an identifier that is unique to the accessing device;
responsive to the received request, select a subset of the populated media aggregator database based on the previously-granted access rights and the identifier of the accessing device; and
present contents of the selected subset of the populated media aggregator database to the accessing device to enable the device to access to the media content files referred to in the selected subset of the media aggregator database.

2. The media aggregator of claim 1, wherein the plurality of interfaces comprises at least one serial port and wherein the second device is directly coupled to the media aggregator through the at least one serial port.

3. The media aggregator of claim 1, further comprising a web interface and wherein the processor is further operable to present the contents of the selected subset of the populated media aggregator database to a display of the accessing device through the web interface and to enable selection and streaming of any media content files referred to in the selected subset of the through the web interface.

4. The media aggregator of claim 1, wherein the media aggregator further comprises a display.

5. The media aggregator of claim 1, wherein the processor is further operable to search the contents of the populated media aggregator database.

6. The media aggregator of claim 1, wherein the processor is further operable to receive a first message, the first message indicating a presence and accessibility of the first device to the media aggregator.

7. The media aggregator of claim 1, wherein the processor is further operable to store a first database on the first device and to populate the first database with references to the media content files stored on the first device and wherein the processor is further operable to store a second database on the second device and to populate the second database with references to the media content files stored on the second device.

8. The media aggregator of claim 1, wherein the media aggregator database is stored at least one of in the media aggregator and remotely from the media aggregator.

9. The media aggregator of claim 1, wherein the processor is further operable to enable the media content files cataloged in the first device to be streamed from the first device to a display of the accessing device and to enable the media content files cataloged in the second device from the second device to be streamed to the display of the accessing device.

10. The media aggregator of claim 1, wherein the processor is further operable to enable the media content files to be streamed to a display of the accessing device from within the local network or from a wide area network.

11. The media aggregator of claim 1, wherein the processor is further operable to receive a first media content update message when the media content files cataloged on the first device change and to receive a second media content update message when the media content files cataloged on the second device change.

12. The media aggregator of claim 1, wherein the processor is further operable to update the media aggregator database to reflect changes in the media content files cataloged on the first device and to update the media aggregator database to reflect changes in the media content files cataloged on the second device.

13. The media aggregator of claim 1, wherein the processor is further operable to:
 enable a creation of an album that comprises media content selected from the media aggregator database;
 generate a link to the created album, and
 send an electronic message containing the link to the album to a selected recipient.

14. A computer-implemented method of aggregating and accessing media content, comprising:
 identifying a presence of a first device on the local network and causing, over the local network, a crawler process to operate on the first device;
 accessing the first device coupled to a local network and cataloging media content files stored on the first device, each of the cataloged media content files stored on the accessed first device being associated with previously-granted access rights;
 accessing a second device and cataloging media content files stored on the second device, each of the cataloged media content files stored on the accessed second device being associated with previously-granted access rights;
 populating a media aggregator database with references to and with the previously-granted access rights associated with the media content files cataloged in the first and second devices;
 receiving a request to access the media aggregator by an accessing device, the request comprising an identifier that is unique to the accessing device;
 selecting a subset of the populated media aggregator database based on the previously-granted access rights and the identifier of the accessing device; and
 presenting contents of the selected subset of the populated media aggregator database to the accessing device to enable the device to access to any of the media content files referred to in the selected subset of the media aggregator database.

15. The computer-implemented method of claim 14, wherein accessing the second device is carried out with the second device being directly connected to the media aggregator through a serial port.

16. The computer-implemented method of claim 14, wherein presenting contents of the selected subset of the populated media aggregator database comprises presenting the contents of the populated media aggregator database to a display of the accessing device through a web interface and enabling selection and streaming of any media content files referred to in the selected subset of the populated media aggregator database through the web interface.

17. The computer-implemented method of claim 14, wherein the media aggregator further comprises a display is part of a client device.

18. The computer-implemented method of claim 14, further comprises searching the contents of the populated media aggregator database.

19. The computer-implemented method of claim 14, further comprising receiving a first message, the first message indicating a presence and accessibility of the first device to data aggregation.

20. The computer-implemented method of claim 14, wherein cataloging the media content files stored on the first device comprises storing a first database on the first device and populating the first database with references to the media content files stored on the first device and wherein cataloging the media content files stored on the second device comprises storing a second database on the second device and populating the second database with references to the media content files stored on the second device.

21. The computer-implemented method of claim 14, further comprising at least one of:
 storing the media aggregator database in the media aggregator, and
 storing the media aggregator database remotely from the media aggregator.

22. The computer-implemented method of claim 14, further comprising streaming the media content files cataloged in the first device from the first device to a display of the accessing device and streaming the media content files cataloged in the second device from the second device to the display the accessing device.

23. The computer-implemented method of claim 14, further comprising streaming the media content files from within the local network or from a wide area network.

24. The computer-implemented method of claim 14, further comprising:
 receiving a first media content update message when the media content files cataloged on the first device change, and
 receiving a second media content update message when the media content files cataloged on the second device change.

25. The computer-implemented method of claim 14, further comprising:
 updating the media aggregator database to reflect changes in the media content flies cataloged on the first device, and
 updating the media aggregator database to reflect changes in the media files content cataloged on the second device.

26. The computer-implemented method of claim 14, further comprising:
 enabling a creation of an album that comprises media content files selected from the media aggregator database;
 generating a link to the created album, and sending an electronic message containing the link to the album to a selected recipient.

\* \* \* \* \*